US007813498B2

(12) United States Patent
Zhang et al.

(10) Patent No.: US 7,813,498 B2
(45) Date of Patent: Oct. 12, 2010

(54) FULL-DUPLEX COMMUNICATION DEVICE AND METHOD OF ACOUSTIC ECHO CANCELLATION THEREIN

(75) Inventors: Ming Zhang, Cupertino, CA (US); Wan-Chieh Pai, San Jose, CA (US)

(73) Assignee: Fortemedia, Inc., Cupertino, CA (US)

( * ) Notice: Subject to any disclaimer, the term of this patent is extended or adjusted under 35 U.S.C. 154(b) by 225 days.

(21) Appl. No.: 11/829,178

(22) Filed: Jul. 27, 2007

(65) Prior Publication Data

US 2009/0028075 A1    Jan. 29, 2009

(51) Int. Cl.
*H04M 9/08* (2006.01)
(52) U.S. Cl. .................... 379/406.08; 370/290
(58) Field of Classification Search .................
379/406.02–406.16, 391–392; 370/286–290
See application file for complete search history.

(56) References Cited

U.S. PATENT DOCUMENTS

| | | | | |
|---|---|---|---|---|
| 5,623,402 | A * | 4/1997 | Johnson ........................ | 700/42 |
| 6,700,977 | B2 * | 3/2004 | Sugiyama .............. | 379/406.08 |
| 7,177,416 | B1 * | 2/2007 | Zhang et al. ........... | 379/387.01 |
| 2007/0280472 | A1* | 12/2007 | Stokes III et al. ...... | 379/406.01 |
| 2009/0003586 | A1* | 1/2009 | Lai et al. ............... | 379/406.01 |

FOREIGN PATENT DOCUMENTS

| | | | |
|---|---|---|---|
| WO | WO 2006040734 A1 * | 4/2006 | |
| WO | WO 2007077536 A1 * | 7/2007 | |

* cited by examiner

*Primary Examiner*—Simon Sing
*Assistant Examiner*—Assad Mohammed
(74) *Attorney, Agent, or Firm*—Thomas, Kayden, Horstemeyer & Risley

(57) ABSTRACT

The invention provides a full-duplex communication device. In one embodiment, the full-duplex communication device comprises a first adaptive filter, a second adaptive filter, a channel decoupling module, and a frequency processing module. The first adaptive filter having a first tap length filters out echoes of a far-end talker from a first near-end signal carrying voices of a near-end talker according to a far-end signal carrying voices of the far-end talker to obtain a second near-end signal. The second adaptive filter having a second tap length less than the first tap length filters out echoes of the far-end talker from the first near-end signal according to the far-end signal to obtain a third near-end signal. The channel decoupling module processes the second near-end signal to generate a fourth near-end signal and subtracts the second near-end signal from the third near-end signal to obtain a fifth near-end signal. Finally, the frequency processing module cancels echoes of the far-end talker from the fourth near-end signal in frequency domain according to the fifth near-end signal to obtain a six near-end signal.

19 Claims, 4 Drawing Sheets

FULL-DUPLEX COMMUNICATION DEVICE AND METHOD OF ACOUSTIC ECHO CANCELLATION THEREIN

BACKGROUND OF THE INVENTION

1. Field of the Invention

The invention relates to acoustic echo cancellation, and more particularly to acoustic echo cancellation in full-duplex communication devices.

2. Description of the Related Art

A full-duplex communication device simultaneously transmits two-way signals to enable a near-end talker and a far-end talker to talk to each other. A full-duplex communication device has two channels, a line-in channel and a line-out channel. The line-in channel receives a far-end signal carrying voices of the far-end talker and broadcasts the far-end signal with a loudspeaker. The line-out channel converts voices of the near-end talker to a near-end signal with a microphone and transmits the near-end signal to the far-end talker. Thus, the near-end talker and the far-end talker separated by a distance can communicate with each other as if they are face to face.

Acoustic Echo cancellation is a major functional element for a hands-free full-duplex communication device. For a full-duplex communication device, a far-end signal carrying voices of a far-end talker should not interfere with a near-end signal carrying voices of a near-end talker. A microphone of a hands-free full-duplex communication device, however, is often located near a loudspeaker of the hands-free full-duplex communication device. When the loudspeaker broadcasts the far-end signal, the microphone converts a portion of voices of the far-end talker to the near-end signal with the voices of the near-end talker. Thus, echo occurs and should be eliminated from the near-end signal. Otherwise, when a far-end device receives and broadcasts the near-end signal, the far-end talker hears both voices of the near-end talker and of himself. Thus, a method for acoustic echo cancellation in a full-duplex communication device is required.

BRIEF SUMMARY OF THE INVENTION

The invention provides a full-duplex communication device. In one embodiment, the full-duplex communication device comprises a first adaptive filter, a second adaptive filter, a channel decoupling module, and a frequency processing module. The first adaptive filter having a first tap length filters out echoes of a far-end talker from a first near-end signal carrying voices of a near-end talker according to a far-end signal carrying voices of the far-end talker to obtain a second near-end signal. The second adaptive filter having a second tap length less than the first tap length filters out echoes of the far-end talker from the first near-end signal according to the far-end signal to obtain a third near-end signal. The channel decoupling module processes the second near-end signal to generate a fourth near-end signal and subtracts the second near-end signal from the third near-end signal to obtain a fifth near-end signal. Finally, the frequency processing module cancels echoes of the far-end talker from the fourth near-end signal in frequency domain according to the fifth near-end signal to obtain a sixth near-end signal.

The invention also provides a method for acoustic echo cancellation in a full-duplex communication device. Echoes of a far-end talker are first filtered out from a first near-end signal carrying voices of a near-end talker according to a far-end signal carrying voices of the far-end talker with a first adaptive filter having a first tap length to obtain a second near-end signal. Echoes of the far-end talker are then filtered out from the first near-end signal according to the far-end signal with a second adaptive filter having a second tap length less than the first tap length to obtain a third near-end signal. The second near-end signal is then processed to generate a fourth near-end signal. The second near-end signal is then subtracted from the third near-end signal to obtain a fifth near-end signal. Finally, echoes of the far-end talker are cancelled from the fourth near-end signal in frequency domain according to the fifth near-end signal with a frequency processing module to obtain a sixth near-end signal.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
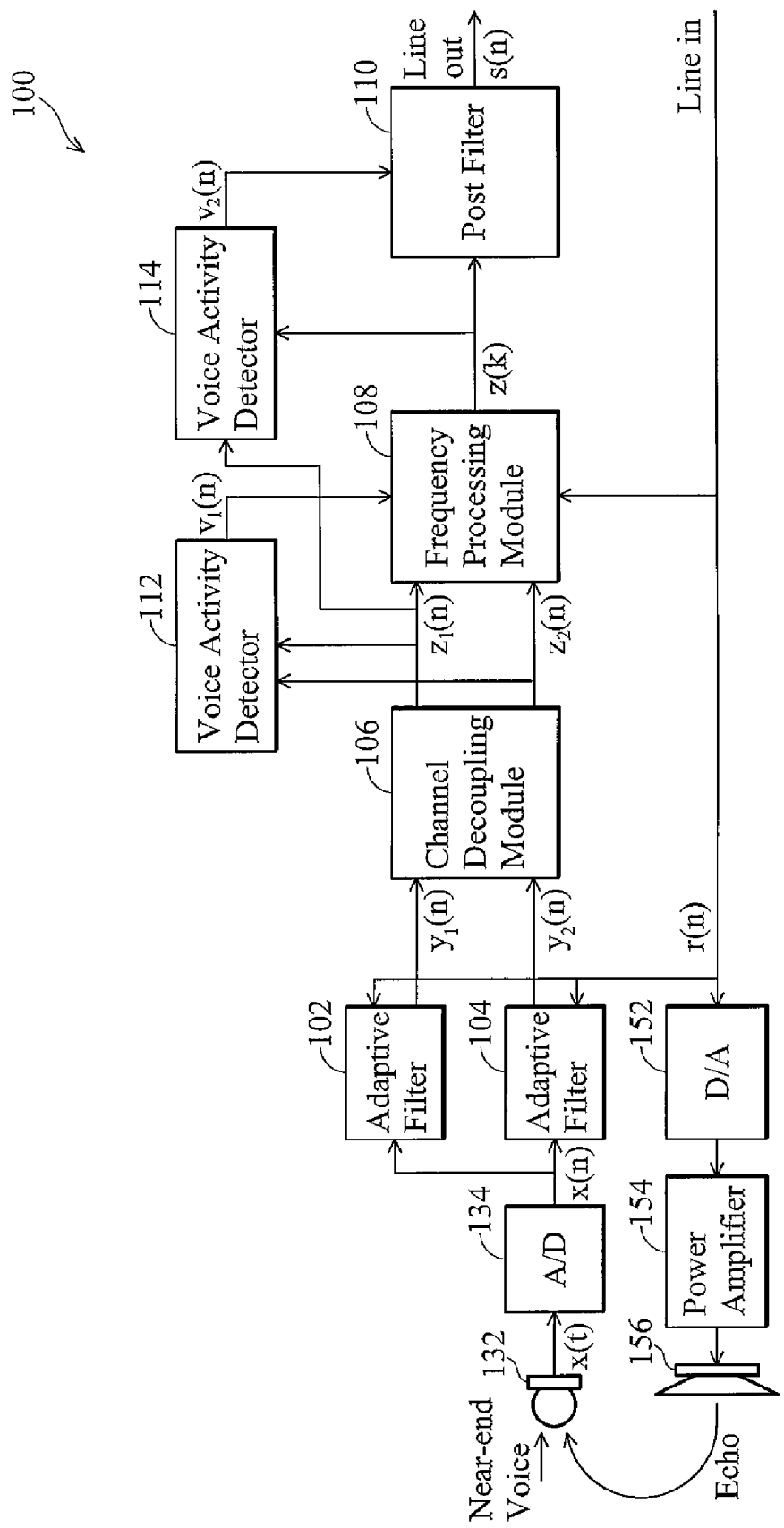
FIG. 1 is a block diagram of a full-duplex communication device according to the invention.

Referring to FIG. 1, a block diagram of a full-duplex communication device 100 according to the invention is shown. The full-duplex communication device 100 comprises a line-in channel shown at the bottom half of FIG. 1 and a line-out channel shown at the upper half of FIG. 1. The line-in channel and the line-out channel are respectively responsible for processing a far-end signal carrying voices of a far-end talker and a near-end signal carrying voices of a near-end talker. Thus, the far-end talker at a far-end and the near-end talker at a near end can communicate with each other.

The line-in channel comprises a digital-to-analog converter 152, a power amplifier 154, and a loudspeaker 156. The digital-to-analog converter 152 first converts a far-end signal r(n) from digital to analog. Because the power of the far-end signal is low and not suitable for broadcasting, the power amplifier 154 then amplifies the far-end signal to a predetermined power level. The loudspeaker 156 then broadcasts the amplified far-end signal.

The line-out channel comprises a microphone 132, an analog-to-digital converter 134, two adaptive filters 102 and 104, a channel decoupling module 106, a frequency processing module 108, a post filter 110, and two voice activity detectors 112 and 114. The microphone 132 first converts voices of a near-end talker to an electric signal x(t). When the loudspeaker 156 broadcasts the far-end signal, however, a portion of voices of the far-end talker generated by the loudspeaker 156 is received by the microphone 132. Thus, the near-end signal x(t) comprises echoes of the far-end talker in addition to the voices of the near-end talker. The analog-to-digital converter 134 then converts the signal x(t) from analog to digital to obtain a signal x(n).

To cancel the echoes of the far-end talker from the near-end signal, a series of modules including the adaptive filters 102 and 104, the channel decoupling module 106, the frequency processing module 108, and the post filter 110 are introduced. The adaptive filter 102 and the adaptive filter 104 have different tap lengths. In one embodiment, the tap length of the adaptive filter 102 is greater than the tap length of the adaptive filter 104. The adaptive filter 102 filters out a portion of the echoes of the far-end talker from the near-end signal $x(n)$ according to the far-end signal $r(n)$ to obtain a near-end signal $y_1(n)$. Similarly, the adaptive filter 104 also filters out a portion of the echoes from the near-end signal $x(n)$ according to the far-end signal $r(n)$ to obtain a near-end signal $y_2(n)$.

Because the tap lengths of the adaptive filters 102 and 104 are different, the signal $x(n)$ is filtered with different levels by the adaptive filters 102 and 104, and the amount of remnant echoes carried by the signals $y_1(n)$ and $y_2(n)$ are also different. For example, if the adaptive filter 102 has a greater tap length than that of the adaptive filter 104, the signal $y_1(n)$ carries fewer echoes than the signal $y_2(n)$. In one embodiment, the adaptive filter 102 generates the signal $y_1(n)$ according to the following algorithm:

$$y_1(n) = x_1(n) - \sum_{l=0}^{K_1} h_1(l) \cdot r(n - l); \text{ and}$$

$$h_1(l)_{n+1} = h_1(l)_n + \mu_1 \frac{y_1(n) \cdot r(n-1)}{\|r(n)\|^2};$$

wherein n and l are sample indexes, $h_1(l)$ is an impulse response of the adaptive filter 102, $r(n)$ is the far-end signal, $K_1$ is the tap length of the adaptive filter 102, and $\mu_1$ is a parameter. The adaptive filter 104 simultaneously generates the signal $y_2(n)$ according to the following algorithm:

$$y_2(n) = x_1(n) - \sum_{l=0}^{K_2} h_2(l) \cdot r(n - l); \text{ and}$$

$$h_2(l)_{n+1} = h_2(l)_n + \mu_2 \frac{y_2(n) \cdot r(n-1)}{\|r(n)\|^2};$$

wherein n and l are sample indexes, $h_2(l)$ is an impulse response of the adaptive filter 104, $r(n)$ is the far-end signal, $K_2$ is the tap length of the adaptive filter 104 and not equal to $K_1$, and $\mu_2$ is a parameter. The parameter $\mu_2$ may have the same value as the parameter $\mu_1$ or a different value from the parameter $\mu_1$.

Figure 2:
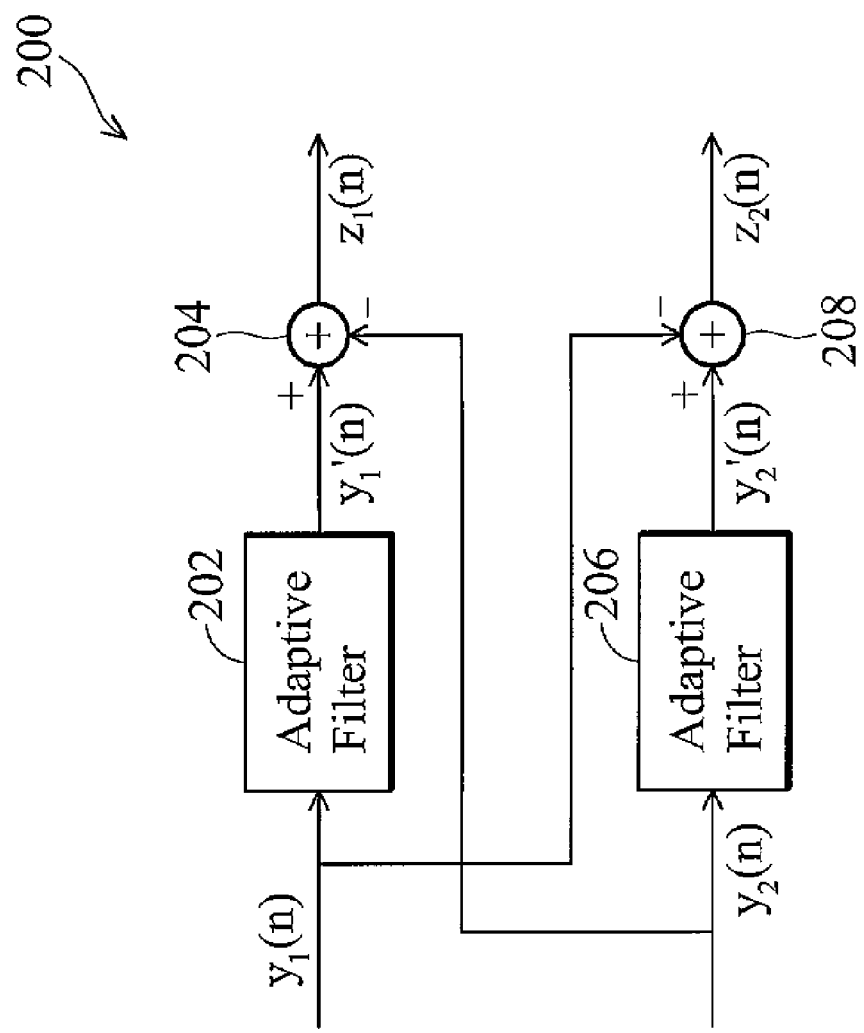
FIG. 2 is a block diagram of a channel decoupling module according to the invention.

The channel decoupling module 106 then filters the signals $y_1(n)$ and $y_2(n)$ to respectively generate the signals $z_1(n)$ and $z_2(n)$. Referring to FIG. 2, a block diagram of a channel decoupling module 200 according to the invention is shown. The channel decoupling module 200 comprises two adaptive filters 202 and 206, and two adders 204 and 208. The adaptive filter 202 filters the signal $y_1(n)$ to obtain a signal $y_1'(n)$, and the adaptive filter 204 filters the signal $y_2(n)$ to obtain a signal $y_2'(n)$. The adder 204 then subtracts the signal $y_2(n)$ from the filtered signal $y_1'(n)$ to obtain the signal $z_1(n)$, and the adder 208 then subtracts the signal $y_1(n)$ from the filtered signal $y_2'(n)$ to obtain the signal $z_2(n)$. In one embodiment, the signal $z_1(n)$ is equal to the signal $y_1(n)$, the signal $z_2(n)$ is equal to a difference between the signal $y_1(n)$ and $y_2(n)$, and the channel decoupling module 106 operates according to the following algorithm:

$$z_1(n) = y_1(n); \text{ and}$$

$$z_2(n) = y_2(n) - y_1(n).$$

Thus, the signal $z_1(n)$ retains a majority of voices of the near-end talker because the signal $y_2(n)$ generated by the adaptive filter 104 carries more echoes than the signal $y_1(n)$ generated by the adaptive filter 102. Meanwhile, the signals $y_1(n)$ and $y_2(n)$ carry similar amount of voices of the near-end talker, and the signal $z_2(n)$ comprises a majority of echoes of the far-end talker.

The frequency processing module 108 then cancels echoes of the far-end talker from the signal $z_1(n)$ in frequency domain according to the signal $z_2(n)$ to obtain a signal $z(k)$. Because the signal $z_2(n)$ mainly comprises echoes of the far-end talker, the frequency processing module 108 takes the signal $z_2(n)$ as a reference to eliminate echoes from the signal $z_1(n)$ in frequency domain. The voices of the near-end talker, however, may be simultaneously eliminated from the signal $z_1(n)$ when the frequency processing module 108 cancels echoes, causing damage to the voice quality of the signal $z(k)$.

To avoid the negative effect in the frequency processing module 108, a voice activity detector 112 is introduced. The voice activity detector 112 detects the power levels of the signals $z_1(n)$ and $z_2(n)$, and calculates a difference between the power levels of the signals $z_1(n)$ and $z_2(n)$. If the difference is greater than a predetermined threshold level, the power level of the signal $z_1(n)$ carrying voices must be much greater than the power level of the signal $z_2(n)$ carrying echo, and the near-end talker is probably talking. Thus, the voice activity detector 112 enables the signal $v_1(n)$ to instruct the frequency processing module 108 to cancel fewer echoes from the signal $z_1(n)$. Thus, the voices of the near-end talker is slightly influenced and retained in the signal $z(k)$. Otherwise, if the difference is smaller than the predetermined threshold level, the near-end talker is probably silent, and the voice activity detector 112 disables the signal $v_1(n)$ to instruct the frequency processing module 108 to cancel more echoes from the signal $z_1(n)$.

The post filter 110 then filters out nonlinear echoes from the signal $z(k)$ in time domain to obtain a signal $s(n)$ as the output of the line-out channel. Similarly, because it is hard to differentiate nonlinear echoes from voices carried by the signal $z(k)$, the post filter 110 may also eliminates voices from the signal $z(k)$ in addition to nonlinear echo, causing damage to the voice quality of the signal $s(n)$. Thus, a voice activity detector 114 is introduced. The voice activity detector 114 detects the power levels of the signals $z_1(n)$ and $z(k)$, and calculates a difference between the power levels of the signals $z_1(n)$ and $z(k)$. If the difference is greater than a predetermined threshold level, the near-end talker is probably talking. Thus, the voice activity detector 114 enables the signal $v_2(n)$ to instruct the post filter 110 to cancel less nonlinear echoes from the signal $z(k)$. Thus, the voices of the near-end talker is slightly influenced and retained in the signal $s(n)$. Otherwise, if the difference is smaller than the predetermined threshold level, the near-end talker is probably silent, and the voice activity detector 114 disables the signal $v_2(n)$ to control the post filter 110 to cancel more echoes from the signal $z(k)$.

Figure 3A:
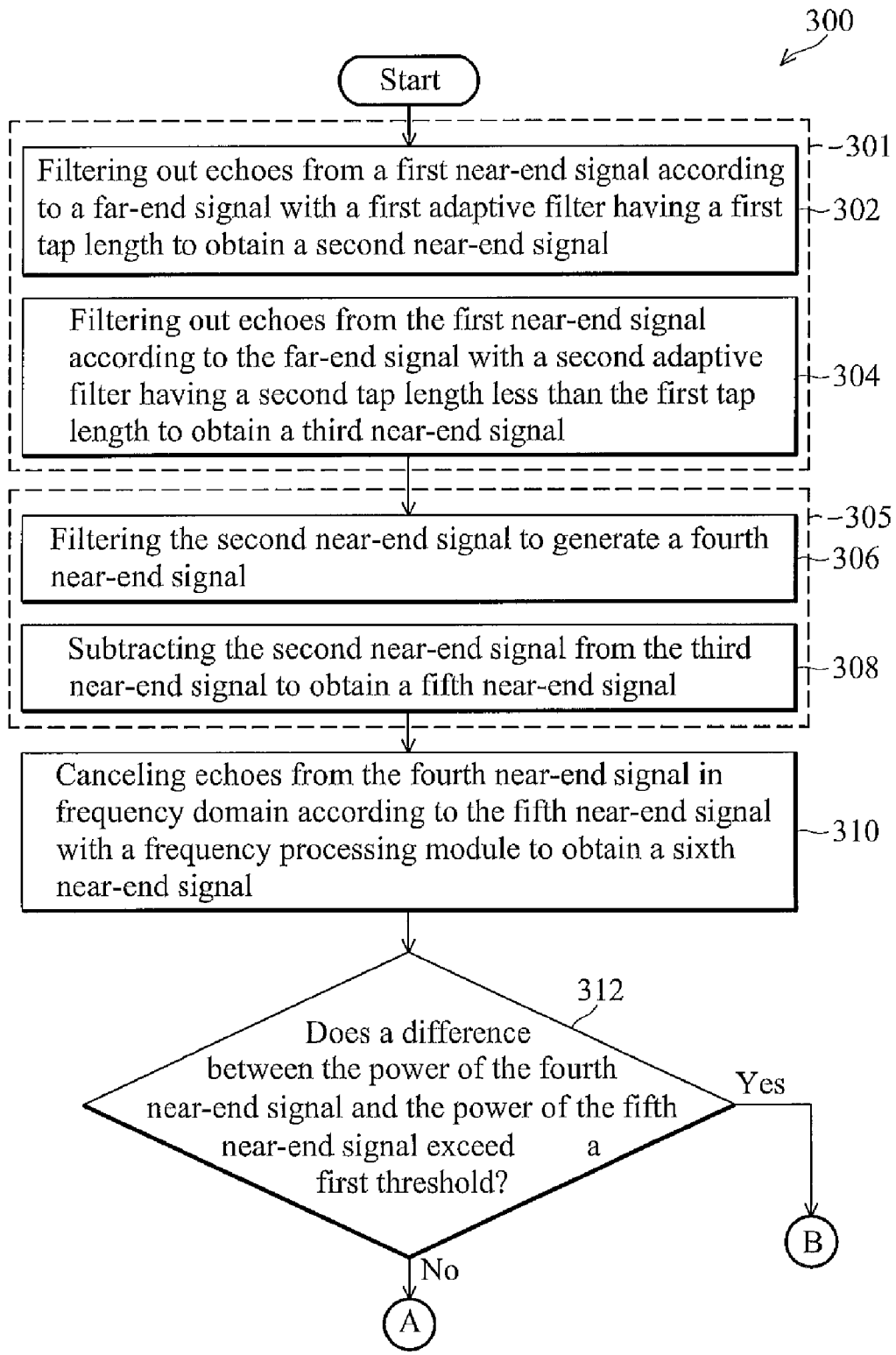
FIG. 3 is a flowchart of a method for acoustic echo cancellation in a full-duplex communication device according to the invention.
Figure 3B:
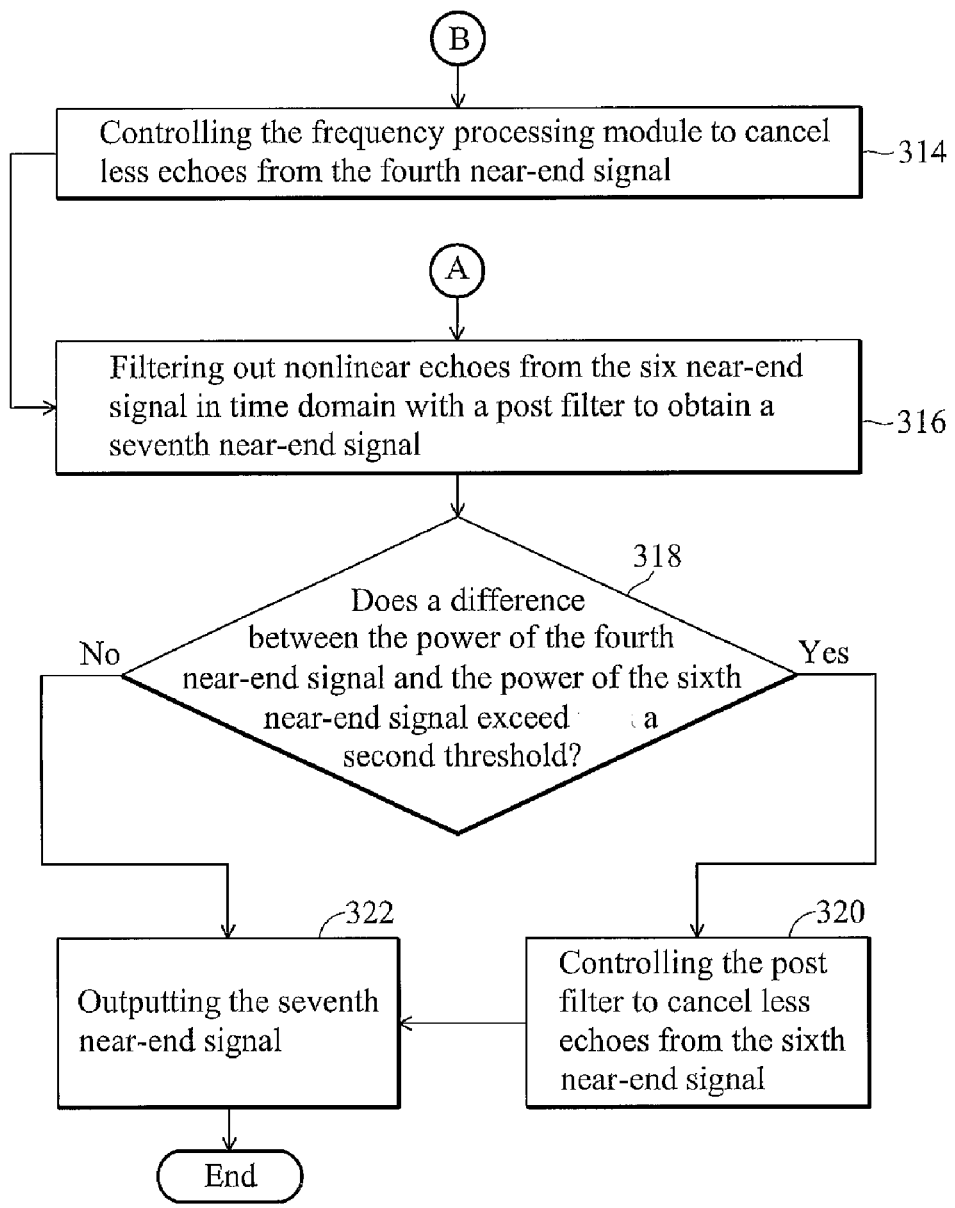

Referring to FIG. 3, a flowchart of a method 300 of acoustic echo cancellation in a full-duplex communication device according to the invention is shown. First, echoes are filtered out from a first near-end signal $x(n)$ according to a far-end signal $r(n)$ with a first adaptive filter 102 having a first tap length to obtain a second near-end signal $y_1(n)$ in step 102. Simultaneously, echoes are filtered out from the first near-end signal $x(n)$ according to the far-end signal with a second adaptive filter 104 having a second tap length less than the first tap length to obtain a third near-end signal $y_2(n)$ in step 104. The second near-end signal $y_1(n)$ is filtered to generate a fourth near-end signal $z_1(n)$ in step 306. The second near-end signal $y_1(n)$ is subtracted from the third near-end signal $y_2(n)$ to obtain a fifth near-end signal $z_2(n)$ in step 308. Echoes are then cancelled once more from the fourth near-end signal $z_1(n)$ in frequency domain according to the fifth near-end signal $z_2(n)$ with a frequency processing module 108 to obtain a sixth near-end signal $z(k)$ in step 310.

If a difference between the power of the fourth near-end signal $z_1(n)$ and the power of the fifth near-end signal $z_2(n)$ exceeds a first threshold level in step 312, the frequency processing module 108 is instructed to cancel fewer echoes from the fourth near-end signal in step 314. Nonlinear echoes are then filtered out from the sixth near-end signal $z(k)$ in time domain with a post filter 110 to obtain a seventh near-end signal $s(n)$ in step 316. If a difference between the power of the fourth near-end signal $z_1(n)$ and the power of the sixth near-end signal $z(k)$ exceeds a second threshold level in step 318, the post filter 110 is instructed to cancel less echoes from the sixth near-end signal $z(k)$ in step 320. Finally, the seventh near-end signal $s(n)$ is output by the line-out channel in step 322.

The invention provides a full-duplex communication device capable of automatically canceling echoes. Given the processes with the adaptive filters 102 and 104, the frequency processing module 108, and the post filter 110, echoes are completely eliminated from the near-end signal $s(n)$, and the far-end talker will not be annoyed with echoes. In addition, the voice activity detectors 112 and 114 carefully detect when a near-end talker is talking to prevent voice component of the near-end signal from being mis-cancelled. Thus, the full-duplex communication device can generate a near-end signal with good voice quality without echo.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A full-duplex communication device, comprising:
a first adaptive filter with a first tap length, filtering out echoes of a far-end talker from a first near-end signal carrying voices of a near-end talker according to a far-end signal carrying voices of the far-end talker to obtain a second near-end signal;
a second adaptive filter with a second tap length less than the first tap length, filtering out echoes of the far-end talker from the first near-end signal according to the far-end signal to obtain a third near-end signal;
a channel decoupling module, filtering the second near-end signal to generate a fourth near-end signal and subtracting the second near-end signal from the third near-end signal to obtain a fifth near-end signal; and
a frequency processing module, canceling echoes of the far-end talker from the fourth near-end signal in frequency domain according to the fifth near-end signal to obtain a sixth near-end signal.

2. The full-duplex communication device as claimed in claim 1, wherein the first adaptive filter filters out echoes according to the following algorithm:

$$y_1(n) = x_1(n) - \sum_{l=0}^{K_1} h_1(l) \cdot r(n-l); \text{ and}$$

$$h_1(l)_{n+1} = h_1(l)_n + \mu_1 \frac{y_1(n) \cdot r(n-1)}{\|r(n)\|^2};$$

wherein $y_1(n)$ is the second near-end signal, $x_1(n)$ is the first near-end signal, n and l are sample indexes, $h_1(L)$ is an impulse response of the first adaptive filter, $r(n)$ is the far-end signal, $K_1$ is the first tap length, and $\mu_1$ is a parameter;

and the second adaptive filter filters out echoes according to the following algorithm:

$$y_2(n) = x_1(n) - \sum_{l=0}^{K_2} h_2(l) \cdot r(n-l); \text{ and}$$

$$h_2(l)_{n+1} = h_2(l)_n + \mu_2 \frac{y_2(n) \cdot r(n-1)}{\|r(n)\|^2};$$

wherein $y_2(n)$ is the third near-end signal, $x_1(n)$ is the first near-end signal, n and l are sample indexes, $h_2(l)$ is an impulse response of the second adaptive filter, $r(n)$ is the far-end signal, $K_2$ is the second tap length and has different value from the first tap length $K_1$, and $\mu_2$ is a parameter and may have different value from $\mu_1$.

3. The full-duplex communication device as claimed in claim 1, wherein the channel decoupling module generates the fourth near-end signal and the fifth near-end signal according to the following algorithm:

$$z_1(n) = y_1(n); \text{ and}$$

$$z_2(n) = y_2(n) - y_1(n);$$

wherein $z_1(n)$ is the fourth near-end signal, $y_1(n)$ is the second near-end signal, $z_2(n)$ is the fifth near-end signal, and $y_2(n)$ is the third near-end signal.

4. The full-duplex communication device as claimed in claim 1, wherein the full-duplex communication device further comprises a post filter, coupled to the frequency processing module, filtering out nonlinear echoes from the sixth near-end signal in time domain to obtain a seventh near-end signal.

5. The full-duplex communication device as claimed in claim 1, wherein the channel decoupling module comprises:
a third adaptive filter, filtering the second near-end signal to obtain an eighth near-end signal;
a first adder, coupled to the third adaptive filter, subtracting the third near-end signal from the eighth near-end signal to obtain the fourth near-end signal;
a fourth adaptive filter, filtering the third near-end signal to obtain a ninth near-end signal; and
a second adder, coupled to the fourth adaptive filter, subtracting the second near-end signal from the ninth near-end signal to obtain the fifth near-end signal.

6. The full-duplex communication device as claimed in claim 1, wherein the full-duplex communication device further comprises a first voice activity detector module, coupled to the channel decoupling module, detecting a first difference between a first power of the fourth near-end signal and a second power of the fifth near-end signal, instructing the frequency processing module to cancel less echoes from the fourth near-end signal when the first difference exceeds a first threshold level, and instructing the frequency processing module to cancel more echoes from the fourth near-end signal when the first difference is less than the first threshold level.

7. The full-duplex communication device as claimed in claim 4, wherein the full-duplex communication device further comprises a second voice activity detector module, coupled to the frequency processing module, detecting a second difference between a third power of the fourth near-end signal and a fourth power of the sixth near-end signal, instructing the post filter to cancel less echoes from the sixth near-end signal when the second difference exceeds a second threshold level, and instructing the post filter to cancel more echoes from the sixth near-end signal when the second difference is less than the second threshold level.

8. The full-duplex communication device as claimed in claim 1, wherein the full-duplex communication device further comprises:
 a microphone, converting voices of the near-end talker to a tenth near-end signal; and
 an analog-to-digital converter, coupled to the microphone, converting the tenth near-end signal from analog to digital to obtain the first near-end signal.

9. A method of acoustic echo cancellation in a full-duplex communication device, comprising:
 filtering out echoes of a far-end talker from a first near-end signal carrying voices of a near-end talker according to a far-end signal carrying voices of the far-end talker with a first adaptive filter having a first tap length to obtain a second near-end signal;
 filtering out echoes of the far-end talker from the first near-end signal according to the far-end signal with a second adaptive filter having a second tap length less than the first tap length to obtain a third near-end signal;
 filtering the second near-end signal to generate a fourth near-end signal;
 subtracting the second near-end signal from the third near-end signal to obtain a fifth near-end signal; and
 canceling echoes of the far-end talker from the fourth near-end signal in frequency domain according to the fifth near-end signal with a frequency processing module to obtain a sixth near-end signal.

10. The method as claimed in claim 9, wherein the first adaptive filter filters out echoes according to the following algorithm:

$$y_2(n) = x_1(n) - \sum_{l=0}^{K_2} h_2(l) \cdot r(n-l); \text{ and}$$

$$h_2(l)_{n+1} = h_2(l)_n + \mu_2 \frac{y_2(n) \cdot r(n-1)}{\|r(n)\|^2};$$

wherein $y_1(n)$ is the second near-end signal, $x_1(n)$ is the first near-end signal, n and l are sample indexes, $h_1(l)$ is an impulse response of the first adaptive filter, r(n) is the far-end signal, $K_1$ is the first tap length, and $\mu_1$ is a parameter;

and the second adaptive filter filters out echoes according to the following algorithm:

$$y_2(n) = x_1(n) - \sum_{l=0}^{K_2} h_2(l) \cdot r(n-l); \text{ and}$$

$$h_2(l)_{n+1} = h_2(l)_n + \mu_2 \frac{y_2(n) \cdot r(n-1)}{\|r(n)\|^2};$$

wherein $y_2(n)$ is the third near-end signal, $x_1(n)$ is the first near-end signal, n and l are sample indexes, $h_2(l)$ is an impulse response of the second adaptive filter, r(n) is the far-end signal, $K_2$ is the second tap length and has different value from the first tap length $K_1$, and $\mu_2$ is a parameter and may have different value from $\mu_1$.

11. The method as claimed in claim 9, wherein the fourth near-end signal and the fifth near-end signal are generated according to the following algorithm:

$$z_1(n) = y_1(n); \text{ and}$$

$$z_2(n) = y_2(n) - y_1(n);$$

wherein $z_1(n)$ is the fourth near-end signal, $y_1(n)$ is the second near-end signal, $z_2(n)$ is the fifth near-end signal, and $y_2(n)$ is the third near-end signal.

12. The method as claimed in claim 9, wherein the method further comprises filtering out nonlinear echoes from the six near-end signal in time domain with a post filter to obtain a seventh near-end signal.

13. The method as claimed in claim 9, wherein the method further comprises:
 detecting a first difference between a first power of the fourth near-end signal and a second power of the fifth near-end signal;
 instructing the frequency processing module to cancel less echoes from the fourth near-end signal when the first difference exceeds a first threshold level; and
 instructing the frequency processing module to cancel more echoes from the fourth near-end signal when the first difference is less than the first threshold level.

14. The method as claimed in claim 12, wherein the method further comprises:
 detecting a second difference between a third power of the fourth near-end signal and a fourth power of the sixth near-end signal;
 instructing the post filter to cancel less echoes from the sixth near-end signal when the second difference exceeds a second threshold level; and
 instructing the post filter to cancel more echoes from the sixth near-end signal when the second difference is less than the second threshold level.

15. The method as claimed in claim 9, wherein the method further comprises:
 converting voices of the near-end talker to a tenth near-end signal with a microphone; and
 converting the tenth near-end signal from analog to digital with an analog-to-digital converter to obtain the first near-end signal.

16. A full-duplex communication device, comprising:
 a first adaptive filter with a first tap length, filtering out echoes of a far-end talker from a first near-end signal carrying voices of a near-end talker according to a far-end signal carrying voices of the far-end talker to obtain a second near-end signal;
 a second adaptive filter with a second tap length less than the first tap length, filtering out echoes of the far-end talker from the first near-end signal according to the far-end signal to obtain a third near-end signal;
 a channel decoupling module, filtering the second near-end signal to generate a fourth near-end signal and subtracting the second near-end signal from the third near-end signal to obtain a fifth near-end signal;

a frequency processing module, canceling echoes of the far-end talker from the fourth near-end signal in frequency domain according to the fifth near-end signal to obtain a sixth near-end signal;

a first voice activity detector module, detecting a first difference between the power levels of the fourth near-end signal and the fifth near-end signal, so as to cancel echoes from the fourth near-end signal according to the first difference; and a second voice activity detector module, detecting a second difference between the power levels of the fourth near-end signal and the sixth near-end signal, so as to cancel echoes from the sixth near-end signal according to the second difference.

17. The full-duplex communication device as claimed in claim 16, wherein the first voice activity detector module instructs the frequency processing module to cancel less echoes from the fourth near-end signal when the first difference exceeds a first threshold level, and instructs the frequency processing module to cancel more echoes from the fourth near-end signal when the first difference is less than the first threshold level.

18. The full-duplex communication device as claimed in claim 16, further comprising:
a post filter, coupled to the frequency processing module, filtering out nonlinear echoes from the sixth near-end signal in time domain to obtain a seventh near-end signal.

19. The full-duplex communication device as claimed in claim 18, wherein the second voice activity detector module instructs the post filter to cancel less echoes from the sixth near-end signal when the second difference exceeds a second threshold level, and instructs the post filter to cancel more echoes from the sixth near-end signal when the second difference is less than the second threshold level.

* * * * *